(12) United States Patent
Chandrasekaran et al.

(10) Patent No.: US 7,443,454 B2
(45) Date of Patent: Oct. 28, 2008

(54) METHOD FOR TREATING INTER-FRAME MOTION IN A COMPOSITE VIDEO SIGNAL

(75) Inventors: Ramesh M. Chandrasekaran, Plano, TX (US); Weider Peter Chang, Hurst, TX (US); Karl Renner, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 539 days.

(21) Appl. No.: 11/240,718

(22) Filed: Oct. 1, 2005

(65) Prior Publication Data

US 2007/0076128 A1  Apr. 5, 2007

(51) Int. Cl.
*H04N 9/78* (2006.01)
*H04N 5/21* (2006.01)

(52) U.S. Cl. .................. 348/666; 348/669; 348/621
(58) Field of Classification Search .............. 348/663, 348/665, 666, 669, 620, 621, 701; *H04N 9/77, H04N 9/78, 5/21*
See application file for complete search history.

(56) References Cited

U.S. PATENT DOCUMENTS

| 6,108,048 A * | 8/2000 | Rinaldi ................. 348/665 |
| 7,046,306 B2 * | 5/2006 | Zhai et al. ............. 348/666 |
| 7,349,033 B2 * | 3/2008 | Chang et al. ........... 348/620 |

* cited by examiner

*Primary Examiner*—Sherrie Hsia
(74) *Attorney, Agent, or Firm*—Wade J. Brady, III; Frederick J. Telecky, Jr.

(57) ABSTRACT

A method for treating inter-frame motion in a series of consecutive signal frames of a composite video signal includes the steps of, for an evaluation pixel position in each frame of a test frame-set including three successive signal frames: (a) determining whether there is at least a predetermined difference in chroma component or in luma component signals at the evaluation pixel; (b) if in step (a) there is not a predetermined difference in chroma component signals or in luma component signals, determining whether a first and third frame of the test frame-set are substantially identical; (c) determining whether at least a first predetermined number of the luma or chroma component signals in the test frame-set present at least one false color; and (d) determining whether at least a second predetermined number of high frequency luma component signals exist in the test frame-set.

19 Claims, 2 Drawing Sheets

METHOD FOR TREATING INTER-FRAME MOTION IN A COMPOSITE VIDEO SIGNAL

BACKGROUND OF THE INVENTION

The present invention is directed to video signal processing, and especially to processing composite video signals. A composite video signal format includes both chroma and luma signal components within the same frequency band. These chroma and luma signal components must be separated for effecting display of information conveyed by the composite video signal such as a video image frame. The process of separation is not an ideal process. Some chroma information may be identified as luma information, and some luma information may be identified as chroma information. Such misidentification may be manifested as artifacts that degrade picture quality.

For a still video picture separation of luma and chroma components signals may be carried out nearly ideally. Inter-frame comb filtering techniques (sometimes referred to as three dimensional luma-chroma separation, or 3DYC) are particularly successful filtering techniques because with a still picture succeeding frames carry substantially unchanged information. However, when there is motion in pictures, succeeding frames carry different information, sometimes significantly different information, thereby limiting the success of an inter-frame comb filtering technique.

There is a need for a signal treatment method that detects and accommodates motion in a picture. There is a need for a signal treatment method that can detect and accommodate motion between frames in composite video signals, especially in composite video signals encoded in a Phase Alternate Line (PAL) television signal standard format.

SUMMARY OF THE INVENTION

A method for treating inter-frame motion in a series of consecutive signal frames of a composite video signal includes the steps of, for an evaluation pixel position in each frame of a test frame-set including three successive signal frames: (a) determining whether there is at least a predetermined difference in chroma component or in luma component signals at the evaluation pixel; (b) if in step (a) there is not a predetermined difference in chroma component signals or in luma component signals, determining whether a first and third frame of the test frame-set are substantially identical; (c) determining whether at least a first predetermined number of the luma or chroma component signals in the test frame-set present at least one false color; and (d) determining whether at least a second predetermined number of high frequency luma component signals exist in the test frame-set.

It is therefore an object of the present invention to provide signal treatment method that detects and accommodates motion in a picture.

It is a further object of the present invention to provide a signal treatment method that can detect and accommodate motion between frames in composite video signals, especially in composite video signals encoded in a Phase Alternation by Line (PAL) television signal standard format.

Further objects and features of the present invention will be apparent from the following specification and claims when considered in connection with the accompanying drawings, in which like elements are labeled using like reference numerals in the various figures illustrating the preferred embodiments of the invention.

DETAILED DESCRIPTION OF THE PREFERRED EMBODIMENT

Composite video signals include both luma and chroma signal components sharing the same bandwidth. In order to glean information from such a composite video signal for display, one must separate luma information from chroma information contained in the composite signal. Such separation is carried out in prior art systems using two-dimensional, or intra-frame processing or filtering. The present invention uses a combination of two-dimensional processing and three-dimensional, or inter-frame processing or filtering (the third dimension being time) to effect the desired luma-chroma separation. The mix of two-dimensional processing and three-dimensional processing used is determined by presence of motion between signal frames. The invention includes a method for detecting such inter-frame motion. The invention seeks to avoid false color and false luma. False luma is often manifested as dot crawl in a display. The invention effects avoiding false color and false luma by canceling chroma frequency signals in the luma band and canceling luma frequency signals in the chroma band.

Figure 1:
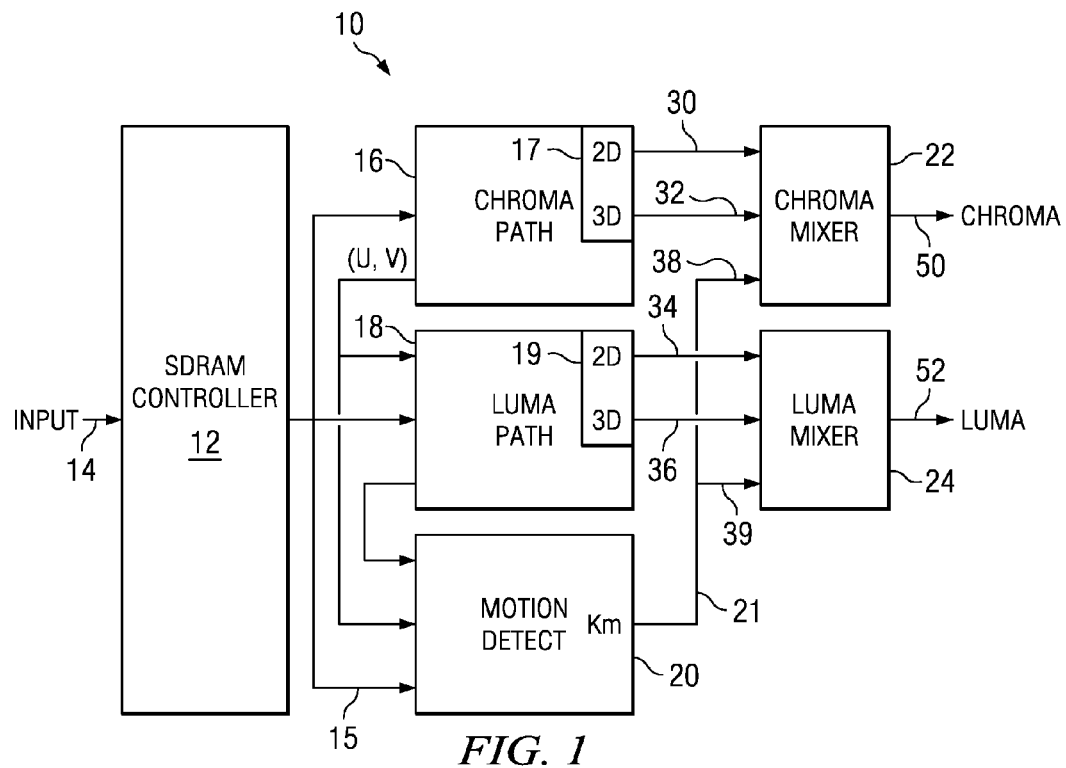
FIG. 1 is a schematic diagram illustrating an apparatus for processing a composite video signal.

FIG. 1 is a schematic diagram illustrating an apparatus for processing a composite video signal. In FIG. 1, a video signal processing apparatus 10 includes a memory device 12 coupled with an input locus 14. Memory device 12 is preferably embodied in an SDRAM (Synchronous Dynamic Random Access Memory) device with an associated controller (not shown in detail in FIG. 1). Apparatus 10 further includes a chroma path processing unit 16, a luma path processing unit 18, a motion detecting unit 20, a chroma mixer unit 22 and a luma mixer unit 24. Each of chroma path processing unit 16, luma path processing unit 18 and motion detecting unit 20 is coupled with memory device 12. Motion detecting unit 20 receives signals from memory unit 12 at a receiving locus 15.

By way of example and not by way of limitation, structure of apparatus 10 and methods employed operating apparatus 10 will be described herein with regard to the PAL (Phase Alternation by Line) format for video signaling. Other formats for video signaling may advantageously employ the method of the present invention as well. Apparatus 10 evaluates and processes composite video signals pixel-by-pixel for a series of test frame-sets. In its preferred embodiment, the method of the present invention operates with a signal processing apparatus such as apparatus 10 employing a test frame-set comprising three consecutive frames of a series of consecutive signal frames received at input locus 14.

Chroma components of video signals may be expressed using parameters u,v. Apparatus 10 couples chroma path processing unit 16 for sharing u,v information with luma path processing unit 18 and with motion detecting unit 20. Luma path processing unit 18 is also coupled with motion detecting unit 20 for sharing luma-related information.

As mentioned earlier herein, video signals received by apparatus 10 at input locus 14 are presented in a series of consecutive signal frames. Chroma path processing unit 16 receives a series of consecutive frames of chroma signal information. Chroma path processing unit 16 includes a filtering unit 17 that provides two-dimensional (2D) filtered signals from chroma path processing unit 16 to chroma mixer unit 22 via a line 30, and provides three-dimensional (3D) filtered signals from chroma path processing unit 16 to chroma mixer unit 22 via a line 32. Motion detect unit 20 provides a scaling factor $K_m$ via lines 21, 38 that is used by chroma mixer unit 22 to effect desired weighting or mixing of two-dimensional (2D) filtered and three-dimensional (3D) filtered chroma component signals received from chroma path processing unit 16 and present a weighted-filtered chroma output signal at a chroma output locus 50.

Luma path processing unit 18 receives a series of consecutive frames of luma signal information. Luma path processing unit 18 includes a filtering unit 19 that provides two-dimensional (2D) filtered signals from luma path processing unit 18 to luma mixer unit 24 via a line 34, and provides three-dimensional (3D) filtered signals from luma path processing unit 18 to luma mixer unit 24 via a line 36. Motion detect unit 20 provides scaling factor $K_m$ via lines 21, 39 that is used by luma mixer unit 24 to effect desired weighting or mixing of two-dimensional (2D) filtered and three-dimensional (3D) filtered luma component signals received from luma path processing unit 18 and present a weighted-filtered luma output signal at a luma output locus 52.

Scaling factor $K_m$ is an indicator of the amount of motion detected by motion detecting unit 20 between consecutive signal frames of a test frame-set. Scaling factor $K_m$ may be employed by chroma mixer unit 22 to weight the amount of two-dimensional (intra-frame) filtering with the amount of three-dimensional (inter-frame) filtering applied to signals in the chroma path (i.e., signals processed by chroma path processing unit 16) for presentation by chroma mixer unit 22 at chroma output locus 50. Scaling factor $K_m$ is also employed by luma mixer unit 24 to weight the amount of two-dimensional (intra-frame) filtering with the amount of three-dimensional (inter-frame) filtering applied to signals in the luma path (i.e., signals processed by luma path processing unit 18) for presentation by luma mixer unit 24 at luma output locus 52.

Figure 2:
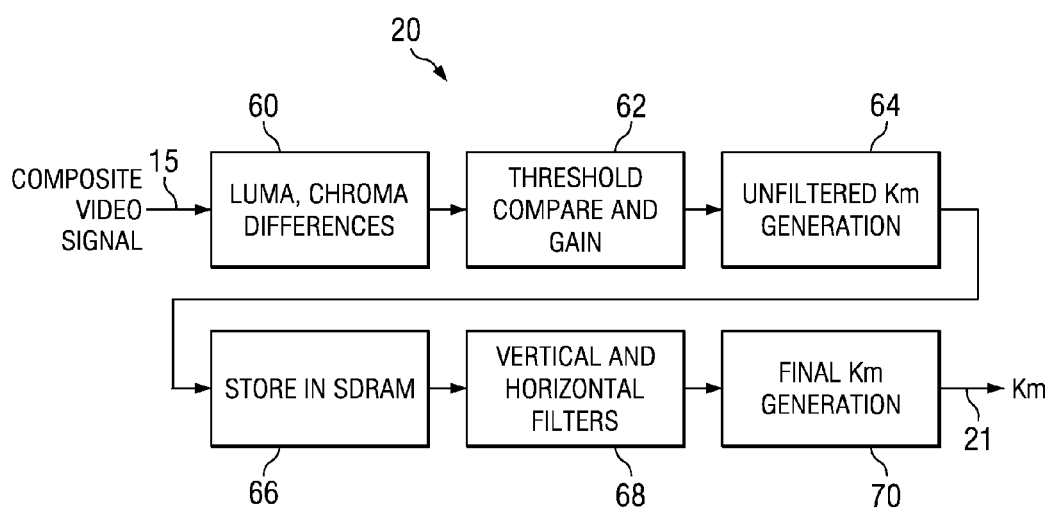
FIG. 2 is a schematic diagram illustrating details of the motion detecting device of the apparatus illustrated in FIG. 1.

FIG. 2 is a schematic diagram illustrating details of the motion detecting device of the apparatus illustrated in FIG. 1. In FIG. 2, motion detecting unit 20 includes a first comparing unit 60, a second comparing unit 62, an initial scaling factor generating unit 64, a storing unit 66, a vertical and horizontal filter unit 68 and a final scaling factor generating unit 70.

First comparing unit 60 compares luma values and chroma values for a pixel among frames in a test frame-set. Preferably a test frame-set comprises three consecutive frames in a series of consecutive signal frames. First comparing unit 60 is coupled with receiving locus 15 for receiving signals from memory unit 12 (FIG. 1). Second comparing unit 62 receives indication of differences among luma values and chroma values from first comparing unit 60. Second comparing unit 62 compares indicated differences with threshold values for those differences and presents results of that threshold comparison to initial scaling factor generating unit 64. An unfiltered or initial scaling factor $K_{Minit}$ is provided to storing unit 66. Storing unit 66 stores initial scaling factor $K_{Minit}$ for later use in subsequent operations either in memory unit 12 (FIG. 1) or in a memory device included within storing unit 66 (not shown in FIG. 2) or in another storage locus (not shown in FIG. 2). Initial scaling factor $K_{Minit}$ is provided to vertical and horizontal filter unit 68 to provide a smooth transition from areas of motion to areas of no motion in an image. A smoothed scaling factor $K_M$ is presented at scaling output locus 21 for use by chroma mixer unit 22 and luma mixer unit 24 (FIG. 1).

By way of example and not by way of limitation, in a PAL format video signal components of real and false color have a complex but predictable relation that causes color comparison between frames to be difficult. This difficulty may be overcome using the method of the invention as follows:

STEP ONE: Determine whether there is a chroma difference or a luma difference among three consecutive frames F1, F2, F3 (i.e., a test frame-set).

For each frame F1, F2, F3 parameters include true contributing elements and false contributing elements:

$$F1: u_1=(u_t+u_f) \; v_1=(v_t+v_f)$$

$$F2: u_2=(u_t+v_f) \; v_2=(v_t+u_f)$$

$$F3: u_3=(u_t-u_f) \; v_3=(v_t-v_f) \qquad [1]$$

Where, "t" indicates true contributing elements; and "f" indicates false contributing elements.

Determine differences:

$$\Delta u = \left(\frac{u_1 + u_3}{2}\right) - \left(u_2 - \frac{v_1 - v_3}{2}\right) \qquad [2]$$

$$\Delta v = \left(\frac{v_1 + v_3}{2}\right) - \left(v_2 - \frac{u_1 - u_3}{2}\right) \qquad [3]$$

Equations [2] and [3] cancel out false color. If $\Delta u$ and $\Delta v \neq 0$, then a chroma difference exists. Existence of a chroma difference implies that motion occurs which in turn implies that filtering weighted toward two dimensional (i.e., intra-frame filtering) should be employed. In practice, Equations [2] and [3] may yield a result x where 0<x<16. Result x may be employed to select a scaling factor $K_m$ for determining weighting of filtering functionality between three-dimensional filtering (i.e., inter-frame filtering) and two-dimensional filtering. Scaling factor $K_m$ may be employed to mix three-dimensional filtering and two-dimensional filtering to effect smoother transitions as images move between frames. A higher value for scaling factor $K_m$ may indicate more two-dimensional filtering and less three-dimensional filtering. A lower value for scaling factor $K_m$ may indicate less two-dimensional filtering and more three-dimensional filtering. An exemplary version of a weighting algorithm for scaling factor $K_m$ may be expressed as:

$$FILTER_{OUT} = \frac{16 - K_M}{16} \cdot 3D + \frac{K_M}{16} \cdot 2D \qquad [4]$$

Where, $FILTER_{OUT}$ is an output signal from a filter unit; and $0 < K_M < 16$.

STEP TWO: Avoid an exceptional case in which particular colors may make $\Delta u = \Delta v = 0$ even when motion is present.

If $\Delta u = \Delta v = 0$, and chroma components of F1=F3 (that is chroma components of frame F1 are identical, or substantially identical, to chroma components of frame F3); then filtering weighted toward three-dimensional filtering may be employed.

STEP THREE: Check for presence of false color.

Both chroma signal components and luma signal components are employed to check for false color. One checks for static (i.e., non-moving) black-and-white images that generate false color by checking chroma signal components for false color. If sufficient false color is found for two consecutive frames Fn, then filtering weighted toward three-dimensional filtering may be employed. If no false color is identified in chroma signal components, then luma signal components are checked for false chroma, which may be manifested as high frequency luma. Such high frequency luma may be detected using filtering techniques. If sufficient false color is identified, filtering weighted toward three-dimensional filtering may be employed.

The above-described steps may then be repeated using another pixel in the extant test frame-set until all pixels in the extant frame set have been treated. When all pixels in the extant frame set have been treated, the above-described steps may be repeated for pixels in a new test frame-set until no frames remain untreated.

Figure 3:
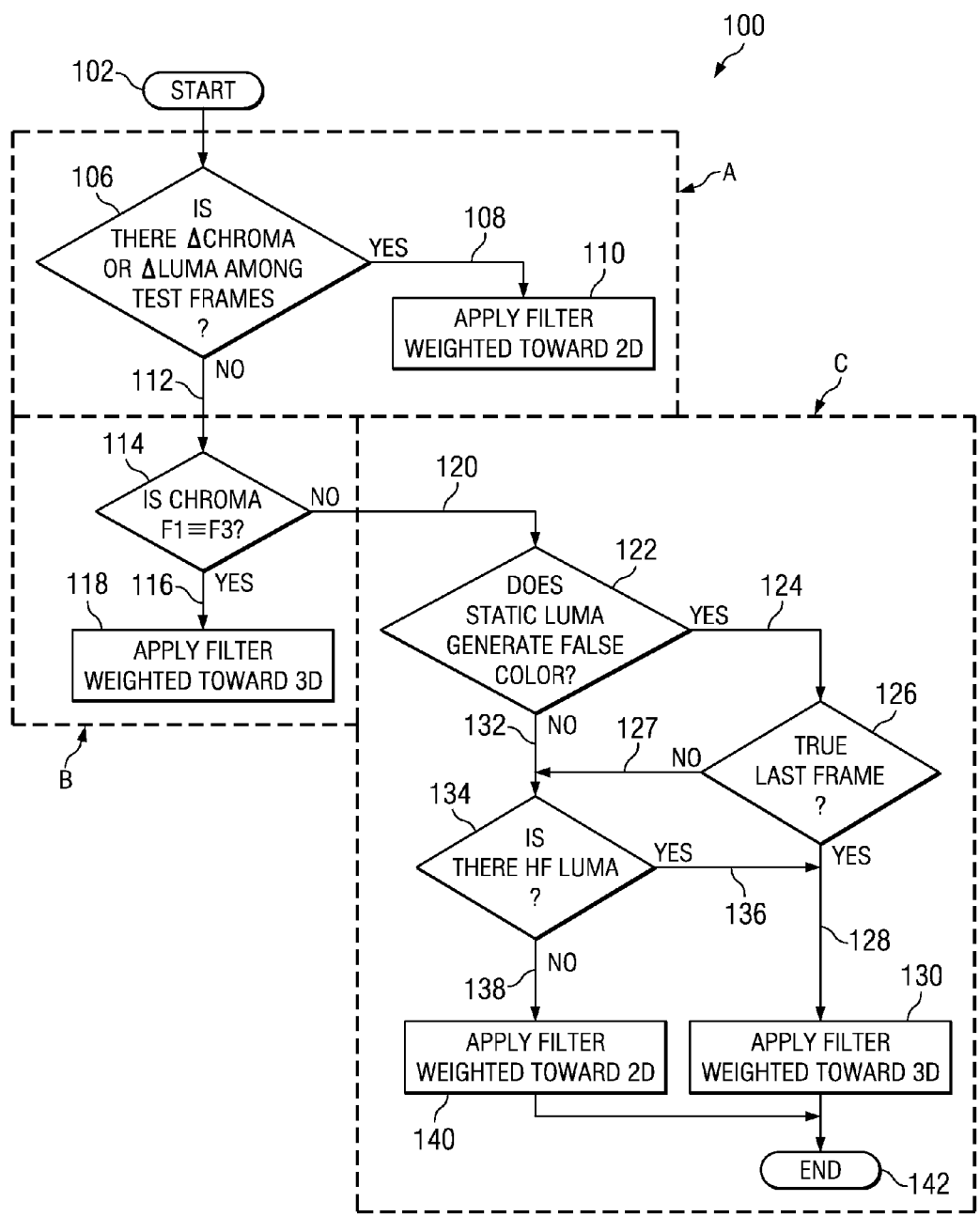
FIG. 3 is a flow diagram illustrating the method of the invention.

FIG. 3 is a flow diagram illustrating the method of the invention. In FIG. 3, a method 100 for treating inter-frame motion in a series of consecutive signal frames of a composite video signal begins at a START locus 102. Method 100 continues with, for an evaluation pixel position in each frame of a test frame-set that includes three successive signal frames of the series of consecutive signal frames: (a) determining whether there is at least a predetermined difference in chroma component signals or a predetermined difference in luma component signals at the evaluation pixel in the test frame-set, as indicated by a query block 106.

If there is at least a predetermined difference in chroma component signals or at least a predetermined difference in luma component signals at the evaluation pixel in the test frame-set, method 100 proceeds from query block 106 via YES response branch 108 to establish the combination weighted toward the intra-frame filtering operation, as indicated by a block 110. One may observe by way of example and not by way of limitation that section A in FIG. 3 containing boxes 106, 110 relates to STEP ONE described above.

If there is not at least a predetermined difference in chroma component signals at the evaluation pixel in the test frame-set, method 100 proceeds from query block 106 via NO response branch 112 and determines whether a chroma component signal of a first signal frame of the test frame-set is substantially identical with a chroma component signal of a third signal frame of the test frame-set, as indicated by a query block 114. If the first signal frame of the test frame-set is substantially identical with the third signal frame of the test frame set, method 100 proceeds from query block 114 via YES response branch 116 and establishes the combination weighted toward the inter-frame filtering operation, as indicated by a block 118. One may observe by way of example and not by way of limitation that section B in FIG. 3 containing boxes 114, 118 relates to STEP TWO described above.

If the first signal frame of the test frame-set is not substantially identical with the third signal frame of the test frame set, method 100 proceeds from query block 114 via NO response branch 120 to determine whether at least a first predetermined number of the luma component signals in the test frame-set present at least one false color, as indicated by a query block 122. The intent of the query represented by query block 122 is to determine whether any luma component signal has generated a color presence in the chroma band.

Method 100 continues by next determining whether at least a second predetermined number of high frequency luma component signals exist in the test frame-set, as indicated by a block 134.

FIG. 3 also addresses how motion detection may be employed for deciding how the composite video may be advantageously treated using the knowledge gained regarding inter-frame motion. If at least a first predetermined number of the chroma component signals in the test frame-set present at least one false color, method 100 proceeds from query block 122 via YES response branch 124 and establishes whether the condition found in response to the query posed at query block 122 was true in the last (i.e., the next-preceding-in-time frame) as indicated by a query block 126. If the condition found in response to the query posed at query block 122 was true in the last frame, that condition is regarded as increasing the probability that the false color being generated in the chroma band is caused by static luma signals and method 100 proceeds from query block 126 via YES response branch 128 to establish the combination weighted toward the inter-frame filtering operation, as indicated by a block 130.

If at least a first predetermined number of chroma component signals in the test frame-set do not present at least one false color, method 100 proceeds from query block 122 via NO response branch 132 and determines whether at least a second predetermined number of high frequency luma component signals exist in the test frame-set, as indicated by a query block 134. If the condition found in response to the query posed at query block 122 was not true in the last frame, method 100 proceeds from query block 126 via NO response branch 127 and determines whether at least a second predetermined number of high frequency luma component signals exist in the test frame-set, as indicated by a query block 134. Query block 134 represents the first time the method represented in FIG. 3 addresses the luma band of the composite video signal.

If at least a second predetermined number of high frequency luma component signals exist in the test frame-set, method 100 proceeds from query block 134 via YES response branch 136 and establishes the combination weighted toward the inter-frame (i.e., 3D) filtering operation, as indicated by block 130. If at least a second predetermined number of high frequency luma component signals does not exist in the test frame-set, method 100 proceeds from query block 134 via NO response branch 138 and establishes the combination weighted toward the intra-frame (i.e., 2D) filtering operation, as indicated by a block 140. One may observe by way of example and not by way of limitation that section C in FIG. 3 containing boxes 122, 126, 130, 134, 140 relates to STEP THREE described above.

The weighted filtering operation is a combination of the intra-frame filtering operation and the inter-frame filtering operation. The combination is established in response to determinings effected in method steps represented by query blocks 106, 114, 122, 126, 134. Method 100 terminates at an END locus 142.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for treating inter-frame motion in a series of consecutive signal frames of a composite video signal; the method comprising the steps of, for an evaluation pixel position in each frame of a test frame-set, said test frame-set including three successive signal frames of said series of consecutive signal frames:
   (a) determining whether there is at least a predetermined difference in chroma component signals or a predetermined difference in luma component signals at said evaluation pixel in said test frame-set;
   (b) if in step (a) there is not a predetermined difference in chroma component signals or a predetermined difference in luma component signals at said evaluation pixel in said test frame-set, determining whether a first signal frame of said test frame-set is substantially identical with a third signal frame of said test frame-set;

(c) determining whether at least a first predetermined number of said luma component signals in said test frame-set present at least one false color; and (d) determining whether at least a second predetermined number of high frequency luma component signals exist in said test frame-set.

2. A method for treating inter-frame motion in a series of consecutive signal frames of a composite video signal as recited in claim 1 wherein the method comprises the further step of:

(e) employing at least one signal filtering unit to effect a weighted filtering operation with said test frame-set; said weighted filtering operation being a combination of an intra-frame filtering operation and an inter-frame filtering operation; said combination being established in response to determinings effected in steps (a) through (d).

3. A method for treating inter-frame motion in a series of consecutive signal frames of a composite video signal as recited in claim 2 wherein the method comprises the further step of: if in step (a) there is a predetermined difference in chroma component signals or a predetermined difference in luma component signals at said evaluation pixel in said test frame-set, establishing said combination weighted toward said intra-frame filtering operation.

4. A method for treating inter-frame motion in a series of consecutive signal frames of a composite video signal as recited in claim 2 wherein the method comprises the further step of: if in step (b) said first signal frame of said test frame-set is substantially identical with said third signal frame of said test frame set, establishing said combination weighted toward said inter-frame filtering operation.

5. A method for treating inter-frame motion in a series of consecutive signal frames of a composite video signal as recited in claim 4 wherein the method comprises the further step of: if in step (c) at least a first predetermined number of said luma component signals in said test frame-set present at least one false color, establishing said combination weighted toward said inter-frame filtering operation.

6. A method for treating inter-frame motion in a series of consecutive signal frames of a composite video signal as recited in claim 5 wherein the method comprises the further step of: if in step (d) at least a second predetermined number of high frequency luma component signals exist in said test frame-set, establishing said combination weighted toward said inter-frame filtering operation.

7. A method for treating inter-frame motion in a series of consecutive signal frames of a composite video signal as recited in claim 6 wherein the method comprises the further step of: if in step (d) less than a second predetermined number of high frequency luma component signals exist in said test frame-set, establishing said combination weighted toward said intra-frame filtering operation.

8. A method for treating inter-frame motion in a series of consecutive signal frames of a composite video signal as recited in claim 2 wherein the method comprises the further step of: if in step (c) at least a first predetermined number of said luma component signals in said test frame-set present at least one false color, establishing said combination weighted toward said inter-frame filtering operation.

9. A method for treating inter-frame motion in a series of consecutive signal frames of a composite video signal as recited in claim 2 wherein the method comprises the further step of: if in step (d) at least a second predetermined number of high frequency luma component signals exist in said test frame-set, establishing said combination weighted toward said inter-frame filtering operation.

10. A method for treating inter-frame motion in a series of consecutive signal frames of a composite video signal as recited in claim 2 wherein the method comprises the further step of: if in step (d) less than a second predetermined number of high frequency luma component signals exist in said test frame-set, establishing said combination weighted toward said intra-frame filtering operation.

11. A method for treating inter-frame motion in a composite video signal; said composite video signal being structured in a series of consecutive signal frames; the method comprising the steps of, for an evaluation pixel position in each frame of a test frame-set; said test frame-set including three successive signal frames of said series of consecutive signal frames:

(a) determining whether there is at least a predetermined difference in chroma component signals or a predetermined difference in luma component signals at said evaluation pixel in said test frame-set;

(b) if in step (a) there is not a predetermined difference in chroma component signals or a predetermined difference in luma component signals at said evaluation pixel in said test frame-set, determining whether a first signal frame of said test frame-set is substantially identical with a third signal frame of said test frame-set;

(c) determining whether at least a first predetermined number of said luma component signals in said test frame-set present at least one false color;

(d) determining whether at least a second predetermined number of high frequency luma component signals exist in said test frame-set; and (e) repeating steps (a) through (d) until substantially all pixels in said test frame-set are treated as evaluation pixels.

12. A method for treating inter-frame motion in a composite video signal as recited in claim 11 wherein the method comprises the further step of: following step (d) and before step (e), effecting a weighted filtering operation with said test frame-set; said weighted filtering operation being a combination of an intra-frame filtering operation and an inter-frame filtering operation; said combination being established in response to determinings effected in steps (a) through (d).

13. A method for treating inter-frame motion in a composite video signal as recited in claim 12 wherein the method comprises the further step of: if in step (a) there is a predetermined difference in chroma component signals or a predetermined difference in luma component signals at said evaluation pixel in said test frame-set, establishing said combination weighted toward said intra-frame filtering operation.

14. A method for treating inter-frame motion in a composite video signal as recited in claim 12 wherein the method comprises the further step of: if in step (b) said first signal frame of said test frame-set is substantially identical with said third signal frame of said test frame set, establishing said combination weighted toward said inter-frame filtering operation in a second signal frame of said test frame-set between said first signal frame and said third signal frame.

15. A method for treating inter-frame motion in a composite video signal as recited in claim 12 wherein the method comprises the further step of: if in step (c) at least a first predetermined number of said luma component signals in said test frame-set present at least one false color, establishing said combination weighted toward said inter-frame filtering operation.

16. A method for treating inter-frame motion in a composite video signal as recited in claim 12 wherein the method comprises the further step of: if in step (d) at least a second predetermined number of high frequency luma component signals exist in said test frame-set, establishing said combination weighted toward said inter-frame filtering operation.

17. A method for treating inter-frame motion in a composite video signal as recited in claim 12 wherein the method comprises the further step of: if in step (d) less than a second predetermined number of high frequency luma component signals exist in said test frame-set, establishing said combination weighted toward said intra-frame filtering operation.

18. A method for treating inter-frame motion in a composite video signal; said composite video signal being structured in a series of consecutive signal frames; the method comprising the steps of, for an evaluation pixel position in each frame of a test frame-set; said test frame-set including three successive signal frames of said series of consecutive signal frames:
   (a) determining whether there is at least a predetermined difference in chroma component signals or a predetermined difference in luma component signals at said evaluation pixel in said test frame-set;
   (b) if in step (a) there is not a predetermined difference in chroma component signals or a predetermined difference in luma component signals at said evaluation pixel in said test frame-set, determining whether a first signal frame of said test frame-set is substantially identical with a third signal frame of said test frame-set;
   (c) determining whether at least a first predetermined number of said luma component signals in said test frame-set present at least one false color;
   (d) effecting a first weighted filtering operation with said test frame-set; said weighted filtering operation being a combination of an intra-frame filtering operation and an inter-frame filtering operation; said combination being established in response to determinings effected in steps (a) through (c).

19. A method for treating inter-frame motion in a composite video signal as recited in claim 18 wherein the method comprises the further step of:
   (d) determining whether at least a second predetermined number of high frequency luma component signals exist in said test frame-set; and
   (e) effecting a second weighted filtering operation with said test frame-set; said weighted filtering operation being a combination of an intra-frame filtering operation and an inter-frame filtering operation; said combination being established in response to determinings effected in step (d).

* * * * *